US009730241B2

(12) United States Patent
Wu et al.

(10) Patent No.: US 9,730,241 B2
(45) Date of Patent: Aug. 8, 2017

(54) SCHEDULING METHOD AND SYSTEM, ACCESS POINT AND STATION

(71) Applicant: Huawei Technologies Co., Ltd., Shenzhen, Guangdong (CN)

(72) Inventors: Tianyu Wu, Shenzhen (CN); Chen Chen, Xi'an (CN); Lina Zhu, Xi'an (CN); Jin Yang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 14/467,958

(22) Filed: Aug. 25, 2014

(65) Prior Publication Data
US 2015/0003377 A1 Jan. 1, 2015

Related U.S. Application Data

(63) Continuation of application No. PCT/CN2013/071843, filed on Feb. 25, 2013.

(30) Foreign Application Priority Data

Feb. 24, 2012 (CN) .......................... 2012 1 0044234

(51) Int. Cl.
H04W 72/12 (2009.01)
H04W 74/08 (2009.01)
(Continued)

(52) U.S. Cl.
CPC ....... *H04W 72/121* (2013.01); *H04W 74/006* (2013.01); *H04W 74/08* (2013.01); *H04W 74/02* (2013.01)

(58) Field of Classification Search
CPC . H04W 74/08; H04W 74/006; H04W 72/121; H04W 72/04; H04W 24/10; H04W 48/16
See application file for complete search history.

(56) References Cited

U.S. PATENT DOCUMENTS

2004/0190467 A1 9/2004 Liu et al.
2005/0075130 A1* 4/2005 Godfrey ................ H04W 16/14
455/552.1
(Continued)

FOREIGN PATENT DOCUMENTS

CN 101395846 A 3/2009
CN 101822107 A 9/2010
(Continued)

OTHER PUBLICATIONS

"IEEE Standard for Information Technology—Telecommunications and information exchange between systems—Local and metropolitan area networks—Specific requirements, Part 11: Wireless LAN Medium Access Control (MAC) and Physical Layer (PHY) Specifications," Amendment 8: Medium Access Control (MAC) Quality of Service Enhancements, IEEE Computer Society, Std P802.11e-2005, pp. i-189, Institute of Electrical and Electronics Engineers, New York, New York (Nov. 11, 2005).
(Continued)

Primary Examiner — Anez Ebrahim
(74) Attorney, Agent, or Firm — Leydig, Voit & Mayer, Ltd.

(57) ABSTRACT

A scheduling method, including: listening to, by a station, a first beacon frame containing a DTIM message used for indicating a beacon interval allocated for each group of stations within a current scheduling period; determining the beacon interval allocated for the station within the current scheduling period according to the DTIM message contained in the first beacon frame; listening to, by the station, within the beacon interval allocated for the station, a second beacon frame containing scheduling information of the current beacon interval used for indicating a time period allocated to each group of stations for data transmission within the current beacon interval; when data transmission is required, transmitting, by the station, data within the time
(Continued)

period allocated to the group of the station according to indication of the scheduling information. The present invention improves utilization of time periods, saves time resources and enhances transmission efficiency.

19 Claims, 12 Drawing Sheets

(51) Int. Cl.
*H04W 74/00* (2009.01)
*H04W 74/02* (2009.01)

(56) References Cited

U.S. PATENT DOCUMENTS

| | | | |
|---|---|---|---|
| 2007/0014269 A1 | 1/2007 | Sherman et al. | |
| 2008/0186945 A1* | 8/2008 | Ahn | H04L 1/16 370/349 |
| 2009/0097428 A1 | 4/2009 | Kneckt et al. | |
| 2010/0232361 A1* | 9/2010 | Hu | H04W 72/0426 370/328 |

FOREIGN PATENT DOCUMENTS

| | | |
|---|---|---|
| CN | 102098225 A | 6/2011 |
| EP | 2579477 A2 | 4/2013 |
| WO | WO 2011149285 A2 | 12/2011 |
| WO | WO 2013049826 A1 | 4/2013 |
| WO | WO 2013134231 A1 | 9/2013 |

OTHER PUBLICATIONS

"IEEE Standard for Information Technology—Telecommunications and information exchange between systems—Local and metropolitan area networks—Specific requirements, Part 11: Wireless LAN Medium Access Control (MAC) and Physical Layer (PHY) Specifications," Amendment 5: Enhancements for Higher Throughput, IEEE Computer Society, Std P802.11n-2009, pp. i-502, Institute of Electrical and Electronics Engineers, New York, New York (Oct. 29, 2009).

"Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Sub 1 GHz License Exempt Operation," IEEE Computer Society, P802.11ah/D3.0, pp. i-583, Institute of Electrical and Electronics Engineers, New York, New York (Oct. 2014).

Gast, "Delivering multicast and broadcast frames: the Delivery TIM (DTIM)," 802.11 Wireless Networks: The Definitive Guide, 2nd Edition, Chapter 8, pp. 192-193, O'Reilly Media Inc., Sebastopol, California (Apr. 25, 2005).

Kuo-Chang et al., "GDCF: Grouping DCF for the MAC layer enhancement of 802.11," Proceedings of the 2006 IEEE Global Telecommunications Conference, San Francisco, California, pp. 1-6, Institute of Electrical and Electronics Engineers, New York, New York (Nov. 27-Dec. 1, 2006).

"Beacon frame," Wikipedia, the free encyclopedia, http://en.wikipedia.org/wiki/Beacon_frame (Nov. 29, 2010).

* cited by examiner

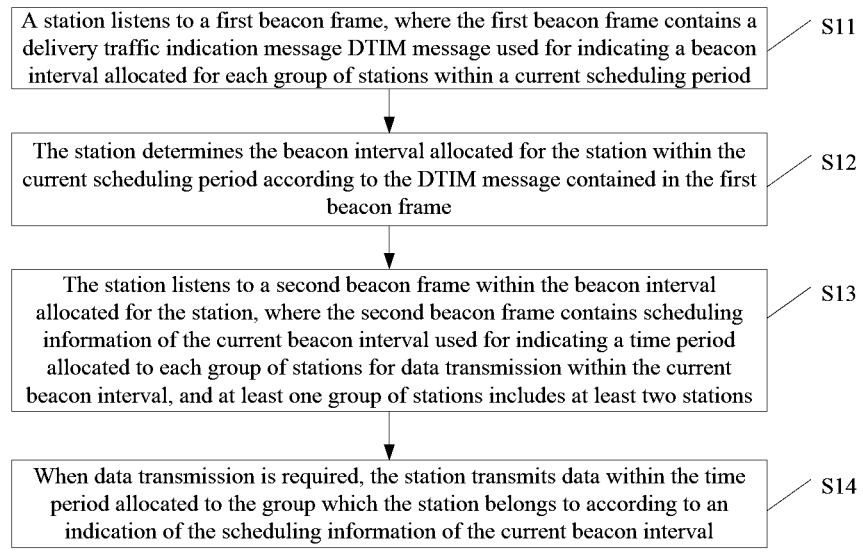
FIG. 1-a
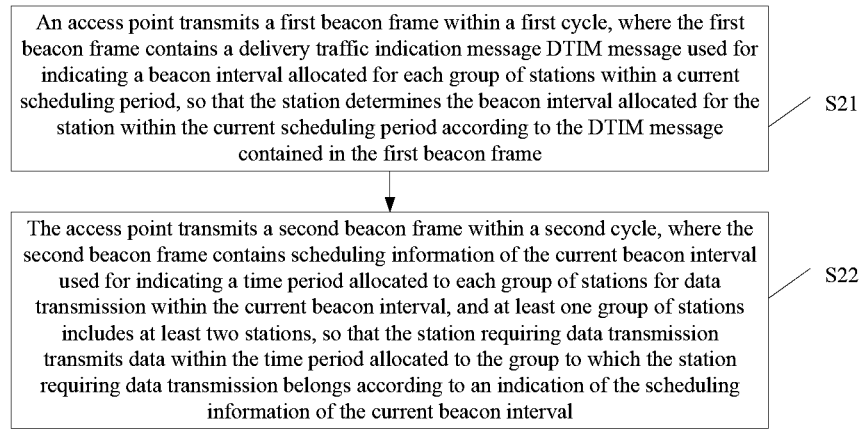
FIG. 1-b

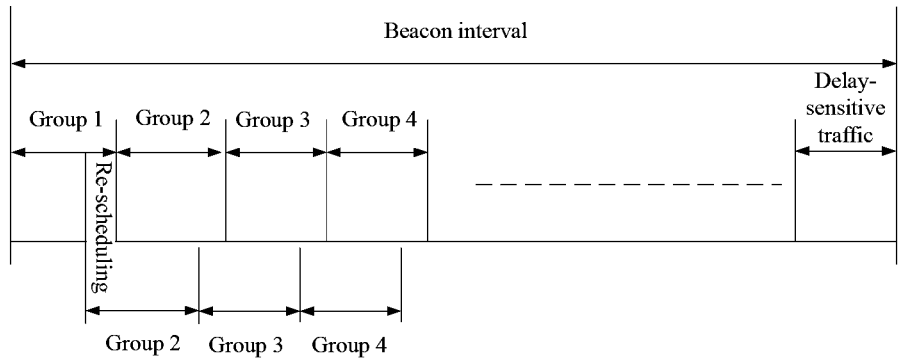
FIG. 10
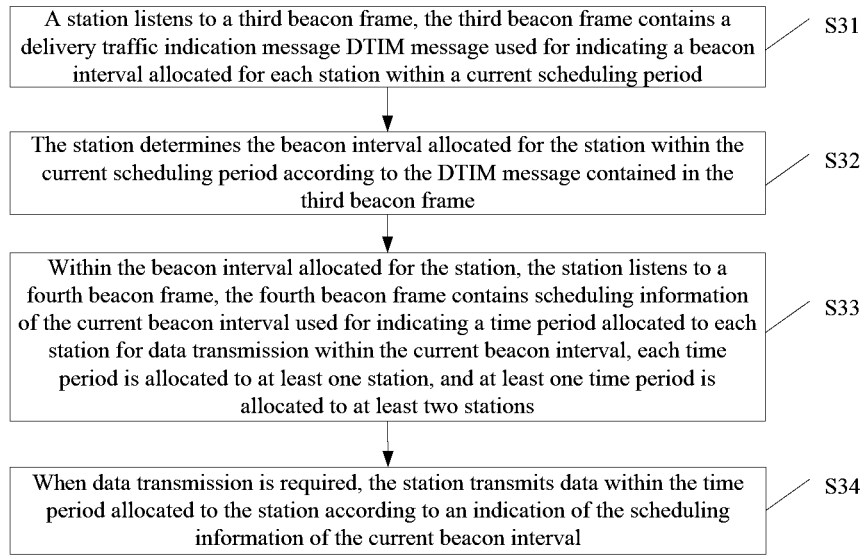
FIG. 11-a

FIG. 11-b

SCHEDULING METHOD AND SYSTEM, ACCESS POINT AND STATION

CROSS-REFERENCE TO RELATED APPLICATIONS

This application is a continuation of International Patent Application No. PCT/CN2013/071843, filed on Feb. 25, 2013, which claims priority to Chinese Patent Application No. 201210044234.7, filed on Feb. 24, 2012, both of which are hereby incorporated by reference in their entireties.

TECHNICAL FIELD

The present invention relates to the field of communication technologies, and particularly to a scheduling method and a system, an access point and a station.

BACKGROUND

With the development of communication technology, people have proposed new requirements on wireless network technologies, namely high speed, large scale and high throughput. The number of subscriber STA (station) in a wireless local area network is increasing, and the contention of the station for accessing to an AP (Access Point, access point) also becomes more intense.

Since the contention-based access method will cause problems such as collision, a scheduling method is currently used, which is mainly to partition a frame into several time periods, each time period is allocated to one station for use, if a station needs to transmit data, then the station accesses to a channel at a corresponding time period, and transmits data.

The existing scheduling method is to allocate one time period to each station for use, but not all the stations have data to be transmitted, thereby wasting time resources and affecting transmission efficiency.

SUMMARY

In order to save time resources and improve transmission efficiency, embodiments of the present invention provide a scheduling method, an access point and a station. The technical solution is described as follows.

A scheduling method, including:
listening to, by a station, a first beacon frame, where the first beacon frame contains a DTIM (Delivery Traffic Indication Message, delivery traffic indication message) message used for indicating a beacon interval allocated for each group of stations within a current scheduling period;
determining, by the station, the beacon interval allocated for the station within the current scheduling period according to the DTIM message contained in the first beacon frame;
listening to, by the station, within the beacon interval allocated for the station, a second beacon frame, where the second beacon frame contains scheduling information of the current beacon interval used for indicating a time period allocated to each group of stations for data transmission within the current beacon interval, and at least one group of stations comprises at least two stations;
when data transmission is required, transmitting, by the station, data within the time period allocated to the group to which the station belongs according to an indication of the scheduling information of the current beacon interval.

A scheduling method, including:
transmitting, by an access point, in a first cycle, a first beacon frame, where the first beacon frame contains a delivery traffic indication message DTIM message used for indicating a beacon interval allocated for each group of stations within a current scheduling period, so that the station determines the beacon interval allocated for the station within the current scheduling period according to the DTIM message contained in the first beacon frame;
transmitting, by the access point, in a second cycle, a second beacon frame, where the second beacon frame contains scheduling information of the current beacon interval used for indicating a time period allocated to each group of stations for data transmission within the current beacon interval, and at least one group of stations comprises at least two stations, so that a station requiring data transmission transmits the data within the time period allocated to the group to which the station requiring data transmission belongs according to an indication of the scheduling information of the current beacon interval.

A scheduling method, including:
listening to, by a station, a third beacon frame, where the third beacon frame contains a delivery traffic indication message DTIM message used for indicating a beacon interval allocated for each station within a current scheduling period;
determining, by the station, the beacon interval allocated for the station within the current scheduling period according to the DTIM message contained in third beacon frame;
listening to, by the station, within the beacon interval allocated for the station, a fourth beacon frame, where the fourth beacon frame contains scheduling information of the current beacon interval used for indicating a time period allocated to each station for data transmission within the current beacon interval, each time period is allocated to at least one station, and at least one time period is allocated to at least two stations;
when data transmission is required, transmitting, by the station, data within the time period allocated to the station according to an indication of the scheduling information of the current beacon interval.

A scheduling method, including:
transmitting, by an access point, in a first cycle, a third beacon frame, where the third beacon frame contains a delivery traffic indication message DTIM message used for indicating a beacon interval allocated for each station within a current scheduling period, so that the station determines the beacon interval allocated for the station within the current scheduling period according to the DTIM message contained in the third beacon frame;
transmitting, by the access point, in a second cycle a fourth beacon frame, where the fourth beacon frame contains scheduling information of the current beacon interval used for indicating a time period allocated to each station for data transmission within the current beacon interval, each time period is allocated to at least one station, and at least one time period is allocated to at least two stations, so that a station requiring data transmission transmits the data within the time period allocated to the station requiring data transmission, according to an indication of the scheduling information of the current beacon interval.

A station, including:
a listening module, configured to listen to a first beacon frame, where the first beacon frame contains a delivery traffic indication message DTIM message used for indicating a beacon interval allocated for each group of stations within a current scheduling period;

a determining module, configured to determine the beacon interval allocated for the station within the current scheduling period according to the DTIM message contained in the first beacon frame;

where the sensing module is further configured to listen, within the beacon interval allocated for the station, a second beacon frame, the second beacon frame contains scheduling information of the current beacon interval used for indicating a time period allocated to each group of stations for data transmission within the current beacon interval, and at least one group of stations comprises at least two stations; and a transmitting module, configured to transmit, when data transmission is required, data within the time period allocated to the group to which the station belongs according to an indication of the scheduling information of the current beacon interval.

An access point, including:

a first transmitting module, configured to transmit in a first cycle a first beacon frame, where the first beacon frame contains a delivery traffic indication message DTIM message used for indicating a beacon interval allocated for each group of stations within a current scheduling period, so that the station determines the beacon interval allocated for the station within the current scheduling period according to the DTIM message contained in the first beacon frame;

a second transmitting module, configured to transmit in a second cycle a second beacon frame, where the second beacon frame contains scheduling information of the current beacon interval used for indicating a time period allocated to each group of stations for data transmission within the current beacon interval, and at least one group of stations comprises at least two stations, so that a station requiring data transmission transmits the data within the time period allocated to the group to which the station requiring data transmission belongs according to an indication of the scheduling information of the current beacon interval.

A station, including:

a listening module, configured to listen to a third beacon frame, where the third beacon frame contains a delivery traffic indication message DTIM message used for indicating a beacon interval allocated for each station within a current scheduling period;

a determining module, configured to determine the beacon interval allocated for the station within the current scheduling period according to the DTIM information contained in the third beacon frame;

wherein the sensing module is further configured to listen to, within the beacon interval allocated for the station, a fourth beacon frame, where the fourth beacon frame contains scheduling information of the current beacon interval used for indicating a time period allocated to each station for data transmission within the current beacon interval, each time period is allocated to at least one station, and at least one time period is allocated to at least two stations; and a transmitting module, configured to transmit, when data transmission is required, data within the time period allocated to the station according to an indication of the scheduling information of the current beacon interval.

An access point, including:

a first transmitting module, configured to transmit in a first cycle a third beacon frame, where the third beacon frame contains a delivery traffic indication message DTIM message used for indicating a beacon interval allocated for each station within a current scheduling period, so that the station determines the beacon interval allocated for the station within the current scheduling period according to the DTIM message contained in the third beacon frame;

a second transmitting module, configured to transmit in a second cycle a fourth beacon frame, where the fourth beacon frame contains scheduling information of the current beacon interval used for indicating a time period allocated to each station for data transmission within the current beacon interval, each time period is allocated to at least one station, and at least one time period is allocated to at least two stations, so that a station requiring data transmission transmits data within the time period allocated to the station requiring data transmission according to an indication of the scheduling information of the current beacon interval.

A scheduling system, including an access point and a station;

the access point includes:

a first transmitting module, configured to transmit in a first cycle, a first beacon frame, where the first beacon frame contains a delivery traffic indication message DTIM message used for indicating a beacon interval allocated for each group of stations within a current scheduling period;

a second transmitting module, configured to transmit, in a second cycle, a second beacon frame, where the second beacon frame contains scheduling information of the current beacon interval used for indicating a time period allocated to each group of stations for data transmission within the current beacon interval, and at least one group of stations comprises at least two stations; and the station includes:

a listening module, configured to listen to the first beacon frame;

a determining module, configured to determine the beacon interval allocated for the station within the current scheduling period according to the DTIM message contained in the first beacon frame;

wherein the listening module is further configured to listen to, within the beacon interval allocated for the station, the second beacon frame; and a transmitting module, configured to transmit, when data transmission is required, data within the time period allocated to the group to which the station belongs according to an indication of the scheduling information of the current beacon interval.

A scheduling system, including an access point and a station;

the access point includes:

a first transmitting module, configured to transmit, in a first cycle, a third beacon frame, where the third beacon frame contains a delivery traffic indication message DTIM message used for indicating a beacon interval allocated for each station within a current scheduling period;

a second transmitting module, configured to transmit, in a second cycle, a fourth beacon frame, where the fourth beacon frame contains scheduling information of the current beacon interval used for indicating a time period allocated to each station for data transmission within the current beacon interval, each time period is allocated to at least one station, and at least one time period is allocated to at least two stations; and the station includes:

a listening module, configured to listen to the third beacon frame;

a determining module, configured to determine the beacon interval allocated for the station within the current scheduling period according to the DTIM message contained in the third beacon frame;

wherein the sensing module is further configured to listen to, within the beacon interval allocated for the station, the fourth beacon frame; and a transmitting module, configured to transmit, when data transmission is required, data within the time period allocated to the station according to an indication of the scheduling information of the current beacon interval.

The technical solution of the present invention has the advantages as follows:

Compared with the solution that one time period is allocated to one station for data transmission, the present solution that at least one time period is allocated to multiple stations for data transmission can improve the utilization of time periods, save time resources and enhance transmission efficiency.

BRIEF DESCRIPTION OF DRAWINGS

To illustrate the technical solutions of the present invention more clearly, the accompanying drawings used in embodiments of the present invention will be introduced in brief hereinafter. Apparently, the accompanying drawings show certain embodiments of the present invention, and persons skilled in the art can derive other drawings from them without creative efforts.

FIG. 1-a is a flow chart of a scheduling method provided in Embodiment 1 of the present invention;

FIG. 1-b is another flow chart of a scheduling method provided in Embodiment 1 of the present invention;

FIG. 10 is a schematic diagram of a time period allocated to each group of stations after re-arranging the allocation time provided in Embodiment 2 of the present invention;

FIG. 11-b is another flow chart of a scheduling method provided in Embodiment 3 of the present invention;

DESCRIPTION OF EMBODIMENTS

Figure 2:
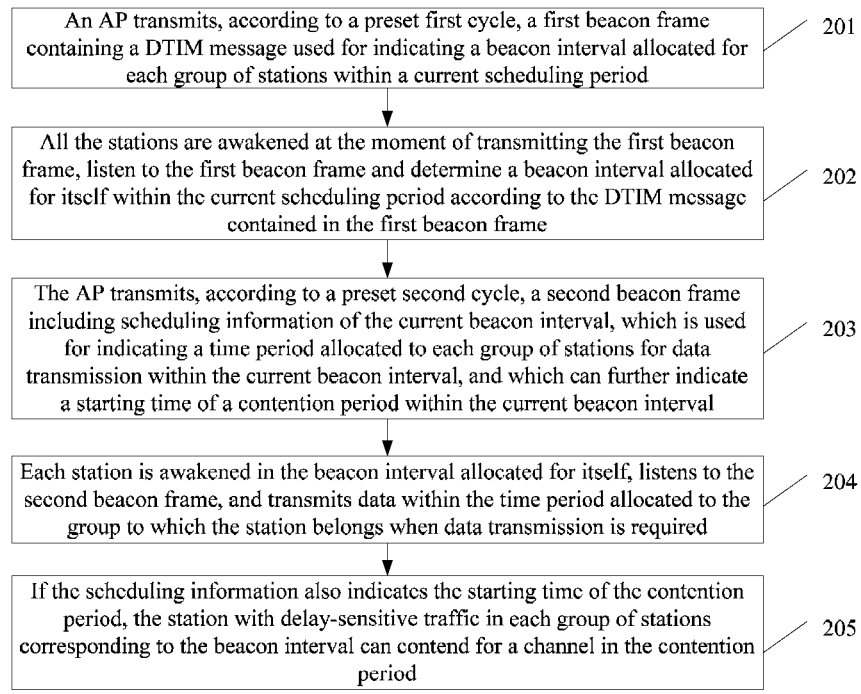
FIG. 2 is a flow chart of a scheduling method provided in Embodiment 2 of the present invention.

In order to make objectives, technical solutions, and advantages of the present invention clearer, embodiments of the present invention are further described below in detail with reference to the accompanying drawings. Embodiments of the present invention are implemented within a WLAN (Wireless Local Area Networks, wireless local area network), taking communication between an access point AP and a subscriber station STA as an example.

Embodiment 1

Referring to FIG. 1-a, the embodiment provides a scheduling method, which can be used by a AP to schedule an STA in the WLAN, and the method includes:

S11: A station listens to a first beacon frame, where the first beacon frame contains a delivery traffic indication message DTIM message used for indicating a beacon interval allocated for each group of stations within a current scheduling period.

In this embodiment, the station can be awakened at a moment of transmitting the first beacon frame.

S12: The station determines the beacon interval allocated for the station within the current scheduling period according to the DTIM message contained in the first beacon frame;

S13: The station listens to a second beacon frame within the beacon interval allocated for the station, where the second beacon frame contains scheduling information of the current beacon interval used for indicating a time period allocated to each group of stations for data transmission within the current beacon interval, and at least one group of stations includes at least two stations;

S14: When data transmission is required, the station transmits data within the time period allocated to the group which the station belongs to according to an indication of the scheduling information of the current beacon interval.

Referring to FIG. 1-b, the embodiment provides a scheduling method, and the method includes:

S21: An access point transmits a first beacon frame in a first cycle, where the first beacon frame contains a delivery traffic indication message DTIM message used for indicating a beacon interval allocated for each group of stations within a current scheduling period, so that the station determines the beacon interval allocated for the station within the current scheduling period according to the DTIM message contained in the first beacon frame;

S22: The access point transmits a second beacon frame in a second cycle, where the second beacon frame contains scheduling information of the current beacon interval used for indicating a time period allocated to each group of stations for data transmission within the current beacon interval, and at least one group of stations includes at least two stations, so that the station requiring data transmission transmits data within the time period allocated to the group to which the station requiring data transmission belongs according to an indication of the scheduling information of the current beacon interval.

Compared with the solution that one time period is allocated to one station for data transmission, this embodiment that at least one time period is allocated to multiple stations for data transmission can improve the utilization of time periods, save time resources and enhance transmission efficiency.

Embodiment 2

Figure 3:
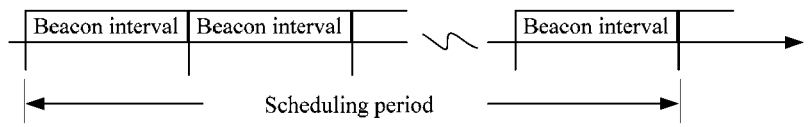
FIG. 3 is a schematic diagram of a scheduling period provided in Embodiment 2 of the present invention.

Referring to FIG. 2, this embodiment provides a scheduling method, where each time period is allocated to one group, and at least one group includes at least two stations, and the method includes:

201: An AP (Access Point, access point) transmits a first beacon (beacon) frame according to a preset first cycle, the first beacon frame contains a DTIM (Delivery Traffic Indication Message, delivery traffic indication message) message used for indicating a beacon interval allocated for each group of stations within a current scheduling period;

Particularly, one scheduling period includes a plurality of beacon intervals, each group will be scheduled once and only once within one scheduling period. FIG. 3 is a schematic diagram of the scheduling period.

Figure 4:
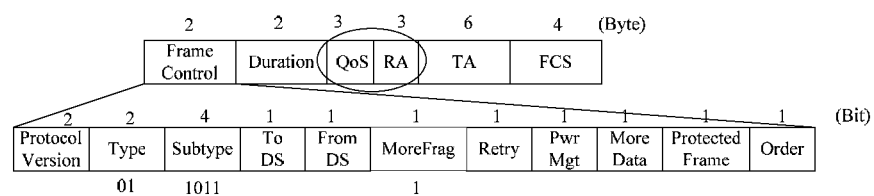
FIG. 4 is a schematic diagram of a modified MAC control header provided in Embodiment 2 of the present invention.
Figure 5:
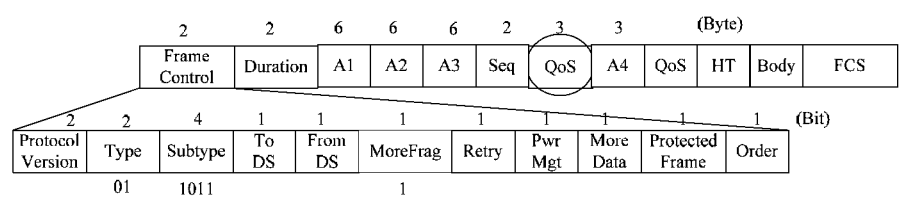
FIG. 5 is a schematic diagram of a modified MAC data header provided in Embodiment 2 of the present invention.

It should be noted that, the AP can partition the stations into different groups according to basis information of the scheduling, such as QoS (Quality of Service, quality of service), reported by each station. Each station can report QoS information based on a QoS field in a modified MAC control header (as shown in FIG. 4) or a modified MAC data header (as shown in FIG. 5). Names or meanings of the fields are as follows:

Frame Control: frame control

Duration: duration, indicating how long a node will occupy a channel

QoS: quality of service, quality of service

RA: receive address, receive address

TA: transmit address, transmit address

FCS: frame check sequence, frame check sequence, for checking whether the received frame is correct Protocol Version: protocol version Type: type, for identifying a function of the frame together with "Subtype"

Subtype: subtype, for identifying the function of the frame together with "Type"

To DS: to distribution system, to distribution system

From DS: from distribution system, from distribution system

MoreFrag: more fragment, more fragment, indicating whether the current MSDU (MAC Service Data Unit, medium access control service data unit)/MMPDU (MAC Management Protocol Data Unit, medium access control management protocol data unit) has other fragments Retry: retry, for identifying whether the frame is a retransmitted frame Pwr Mgt: power management, power management, for identifying the power management mode of the node More Data: more data, using by the AP to identity whether the AP still has buffered data of the station Protected Frame: protected frame, for identifying whether the frame body has been processed by "cryptographic encapsulation (cryptographic encapsulation)" algorithm Order: order A1: address 1, receiving address of the frame A2: address 2, transmitting address of the frame A3: address 3, destination address of the frame Seq: sequence, for identifying a sequence number of MSDU/MMPDU A4: address 4, address 4, reserved HT: High-throughput, highest throughput, for identifying whether the rate supported by the node is greater than or equal to 100 Mb/s

202: All the stations are awakened at the moment of transmitting the first beacon frame, listen to the first beacon frame and determine a beacon interval allocated for itself within the current scheduling period according to the DTIM message contained in the first beacon frame.

Figure 6:
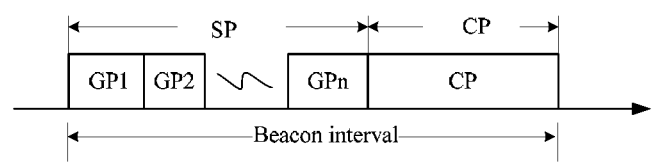
FIG. 6 is a schematic diagram of a beacon interval provided in Embodiment 2 of the present invention.

203: The AP transmits a second beacon frame according to a preset second cycle, and the second beacon frame includes scheduling information of the current beacon interval, which is used for indicating a time period allocated to each group of stations for data transmission within the current beacon interval, and which can further indicate a starting time of a contention period within the current beacon interval;

Particularly, one beacon interval includes one fixed-length period, the fixed-length period (set as SP) is partitioned into at least two time periods (set as GP), each time period is allocated to one group, and at least one group comprises at least two stations. Further, after the fixed-length period, one beacon interval also includes a contention period (CP, Content Period), and the station with delay-sensitive traffic can contend for a channel in the contention period. FIG. 6 is a schematic diagram of the beacon interval.

It should be noted that, the number of time periods allocated for each group of stations can be set according to the number of the stations in each group, in a condition that the total number of the stations is constant, the more stations in a group, the shorter time period allocated for each station of this group, on the contrary, the less stations in a group, the longer time periods allocated for each station of this group.

It should be noted that, the length of time periods allocated for each group of stations can be set according to the number of the stations in each group and historic traffic situations, for example, the group with more stations and larger traffic amount corresponds to a longer time period.

204: Each station is awakened in the beacon interval allocated for itself, listens to the second beacon frame, and transmits data within the time period allocated to the group to which the station belongs when data transmission is required;

The station transmits data within the time period allocated to the group to which the station belongs, which particularly has two manners:

A first manner is that, the station transmits data in a contention mode within the time period allocated to the group to which the station belongs. In the contention mode, the contention can be made by adopting RTS/CTS (Request To Send/Clear To Send, request to send/clear to send) handshake mechanism. Particularly, each station contends for a channel using an RTS frame, once a certain station succeeds in transmitting the RTS frame and receives a CTS frame responded by an AP, then the station immediately transmits its own data frame, and other stations within the group can detect the data frame transmitted by the station.

A second manner is that, the AP assigns a sub time period for the station to transmit data within the time period allocated to the group to which the station belongs, and the station transmits data, according to the sub time period assigned by the AP.

205: If the scheduling information also indicates the starting time of the contention period, the station with delay-sensitive traffic in each group of stations corresponding to the beacon interval can contend for a channel in the contention period.

Figure 7:
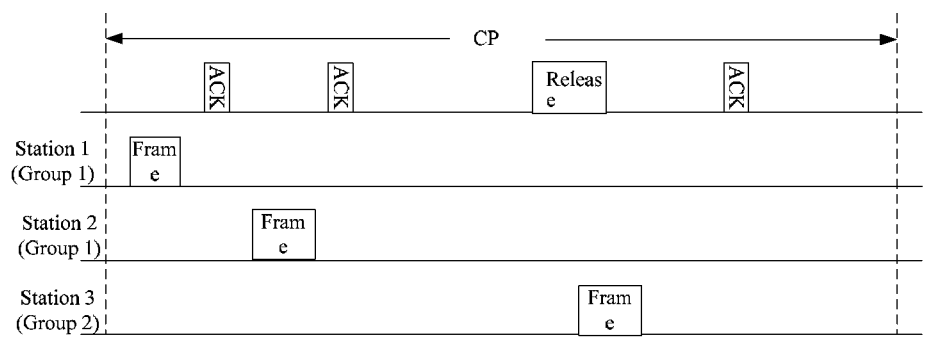
FIG. 7 is a schematic diagram of a contention provided in Embodiment 2 of the present invention.

A contention period is reserved in the beacon interval for data transmission by the station with delay-sensitive traffic, which can well take account of the transmission efficiency of the delay-sensitive traffic during scheduling. FIG. 7 is a schematic diagram of a contention, and particularly,

2051: The station with delay-sensitive traffic in each group of stations corresponding to the beacon interval can contend for a channel in the contention period;

Particularly, there can be two methods for channel contention:

One method is that, for a small data service scenario, each station contends for a channel directly with a data frame so as to reduce overhead.

The other is to contend for a channel with an RTS/CTS mechanism, particularly, each station contends for a channel with an RTS frame, once a certain station succeeds in transmitting the RTS frame and receives a CTS frame responded by an AP, then the station immediately transmits its own data frame, and other stations within the group can detect the data frame transmitted by the station.

Figure 8:
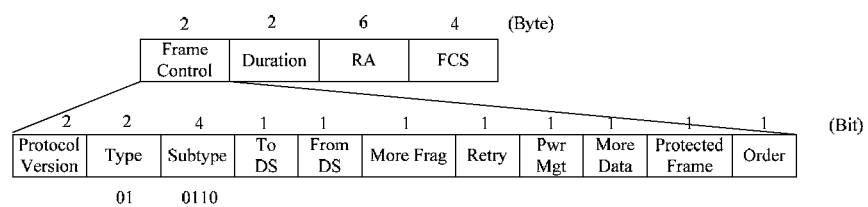
FIG. 8 is a schematic diagram of a first releasing message provided in Embodiment 2 of the present invention.

2052: When a station successfully contends for the channel, the AP returns an acknowledgment message (ACK) to the station, so as to notify that the contention period is allocated to the station with delay-sensitive traffic in the group to which the station belongs, and meanwhile starts to timing;

2053: Other stations in the group to which the station belongs determine that this group of stations successfully contends for the channel, the station with delay-sensitive traffic in this group of stations which successfully contends for the channel, can contend for the channel within a first duration;

2054: The AP transmits a first release (release) message when the first duration is arrived, for releasing the remaining time period of the contention period;

Particularly, FIG. 8 is a schematic diagram of a first releasing message.

2055: After the station with delay-sensitive traffic in each group of stations corresponding to the beacon interval receives the first release message, return to step 2051, and continue to start a contention for the remaining time period of the contention period.

On the basis of the above scheduling process, in order to avoid overlong idle time of the channel, further save time sources, and improve transmission efficiency, optionally, the scheduling method provided in this embodiment further can re-arrange and re-allocate time, which particularly includes:

The AP detects a channel is idle during a second duration within the time period allocated to each group of stations, the AP issues a second release message containing a time period re-arranged by the AP and allocated to each group of stations to actively release time remained in corresponding time period of the group, each station transmits data within the time period allocated to the group to which the station belongs according to the time period re-arranged by the AP and allocated to the group to which the station belongs, so that scheduling of other group can be advanced when a group of stations have idle time periods, so as to avoid overlong idle time of the channel.

Figure 9:
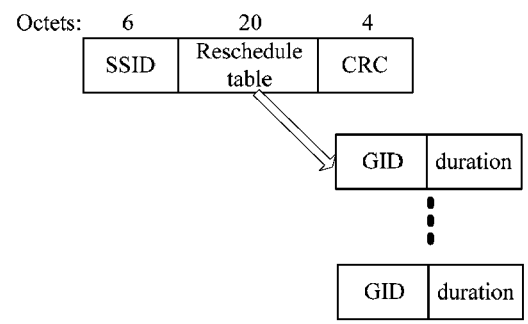
FIG. 9 is a schematic diagram of a second releasing message provided in Embodiment 2 of the present invention.

Particularly, FIG. 9 is a schematic diagram of a second releasing message. Particularly, names or meanings of the fields are as follows:

SSID: service set identifier

Reschedule table: schedule table

GID: group identify, group identifier duration: duration of the group, also the time period allocated to the group CRC: cyclic redundancy check code Particularly, a schematic diagram of a time period allocated to each group of stations after re-arranging the allocation time (i.e., re-scheduling) is as shown in FIG. 10. It should be noted that, if there is still time remained in the beacon interval after re-arranging and allocating time, it can be used for data transmission by the station with delay-sensitive traffic, and the specific process may refer to step 205.

Compared with the solution that one time period is allocated to one station for data transmission, this embodiment that one time period is allocated to one group of stations for data transmission and at least one group of stations comprises at least two stations can improve the utilization of time periods, save time resources and enhance transmission efficiency. In addition, a contention period is reserved in the beacon interval for data transmission by the station with delay-sensitive traffic, which can well take account of the transmission efficiency of the delay-sensitive traffic during scheduling. In addition, detecting a channel is idle during a preset duration within a time period allocated to each group of stations, issuing a second release message to actively release time remained in corresponding time period of the group, and re-arranging a time period allocated to each group of stations, can avoid overlong idle time of the channel, further save time sources, and improve transmission efficiency.

Embodiment 3

Figure 11:
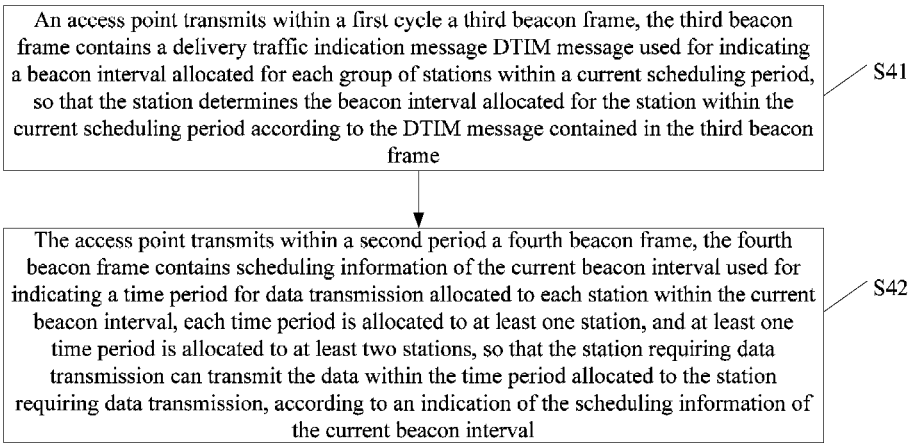
FIG. 11-a is a flow chart of a scheduling method provided in Embodiment 3 of the present invention.

Referring to FIG. 11-*a*, this embodiment provides a scheduling method, which can be used for scheduling an STA by an AP in the WLAN, and the method includes:

S31: A station listens to a third beacon frame, the third beacon frame contains a delivery traffic indication message DTIM message used for indicating a beacon interval allocated for each station within a current scheduling period;

S32: The station determines the beacon interval allocated for the station within the current scheduling period according to the DTIM message contained in the third beacon frame;

S33: Within the beacon interval allocated for the station, the station listens to a fourth beacon frame, the fourth beacon frame contains scheduling information of the current beacon interval used for indicating a time period allocated to each station for data transmission within the current beacon interval, each time period is allocated to at least one station, and at least one time period is allocated to at least two stations;

S34: When data transmission is required, the station transmits data within the time period allocated to the station according to an indication of the scheduling information of the current beacon interval.

Referring to FIG. 11-*b*, this embodiment provides a scheduling method, and the method includes:

S41: An access point transmits in a first cycle a third beacon frame, the third beacon frame contains a delivery traffic indication message DTIM message used for indicating a beacon interval allocated for each group of stations within a current scheduling period, so that the station determines the beacon interval allocated for the station within the current scheduling period according to the DTIM message contained in the third beacon frame;

S42: The access point transmits within a second period a fourth beacon frame, the fourth beacon frame contains scheduling information of the current beacon interval used for indicating a time period for data transmission allocated to each station within the current beacon interval, each time period is allocated to at least one station, and at least one time period is allocated to at least two stations, so that the station requiring data transmission can transmit the data within the time period allocated to the station requiring data transmission, according to an indication of the scheduling information of the current beacon interval.

Compared with the solution that one time period is allocated to one station for data transmission, this embodiment that at least one time period is allocated to multiple stations for data transmission can improve the utilization of time periods, save time resources and enhance transmission efficiency.

Embodiment 4

Figure 12:
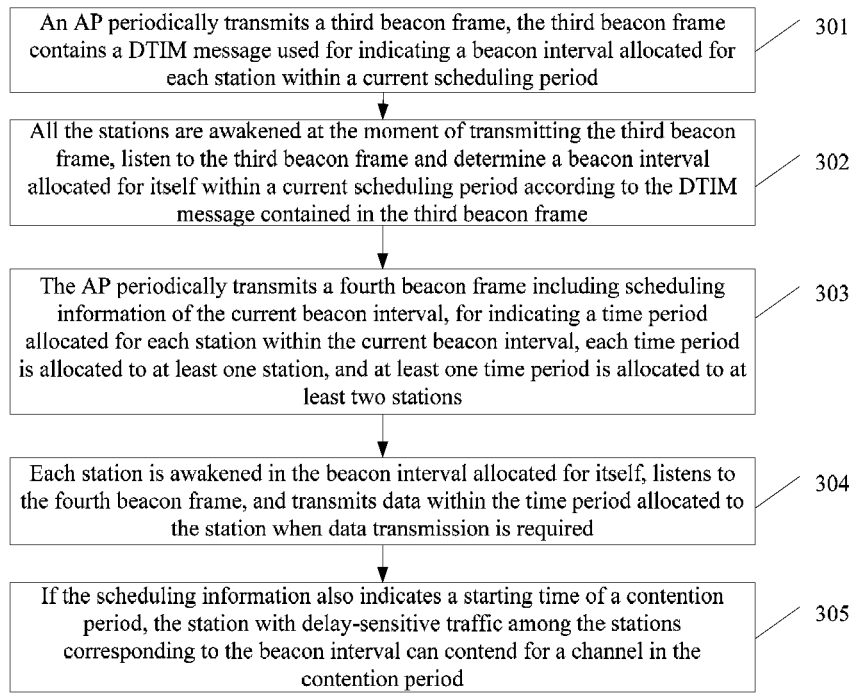
FIG. 12 is a flow chart of a scheduling method provided in Embodiment 4 of the present invention.

Referring to FIG. 12, this embodiment provides a scheduling method, where each time period is allocated to at least one station, and at least one time period is allocated to at least two stations, and the method includes:

301: An AP transmits a third beacon frame according to a preset first cycle, the third beacon frame contains a DTIM message used for indicating a beacon interval allocated for each station within a current scheduling period;

Particularly, one scheduling period includes a plurality of beacon intervals, and within one scheduling period, each station may be allocated with one time period.

302: All the stations are awakened at the moment of transmitting the third beacon frame, listen to the third beacon frame and determine a beacon interval allocated for itself within a current scheduling period according to the DTIM message contained in the third beacon frame.

303: The AP transmits a fourth beacon frame according to a preset second period, and the fourth beacon frame includes scheduling information of the current beacon interval, which is used for indicating a time period allocated for each station within the current beacon interval, where each time period is allocated to at least one station and at least one time period is allocated to at least two stations, and which is able to further indicate a starting time of a contention period within the current beacon interval;

Particularly, one beacon interval includes one fixed-length period, which is partitioned into at least two time periods, each time period is allocated to at least one station, and at least one time period is allocated to at least two stations. Further, after the fixed-length period, one beacon interval also includes a contention period (Content Period), and the station with delay-sensitive traffic can contend for a channel in the contention period.

It should be noted that, the number of time periods can be set according to the number of the stations allocated in each time period, in a condition that the total number of the stations is constant, the more stations allocated in each time period, the less time periods, on the contrary, the less stations allocated in each time period, the more time periods.

It should be noted that, the length of time periods can be set according to the number of the stations allocated in each time period and historic traffic situations, for example, the time period with more stations allocated and larger traffic is longer.

304: Each station is awakened in the beacon interval allocated for itself, listens to the fourth beacon frame, and transmits data within the time period allocated to the station when data transmission is required;

The station transmits data within the time period allocated to the station, which particularly has two manners:

One manner is that, the station transmits data in a contention mode within the time period allocated to the station. In the contention mode, the contention can be made by adopting RTS/CTS (Request To Send/Clear To Send, request to send/clear to send) handshake mechanism. Particularly, each station contends for a channel using an RTS frame, once a certain station succeeds in transmitting the RTS frame and receives a CTS frame responded by an AP, then the station immediately transmits its own data frame, and other stations within the time period can detect the data frame transmitted by the station.

A second manner is that, the AP assigns a sub time period for each station to transmit data within the time period allocated to the station, and the station transmits data according to the sub time period assigned by the AP.

305: If the scheduling information also indicates a starting time of a contention period, the station with delay-sensitive traffic among the stations corresponding to the beacon interval can contend for a channel in the contention period.

A contention period is reserved in the beacon interval for data transmission by the station with delay-sensitive traffic, which can well take account of the transmission efficiency of the delay-sensitive traffic during scheduling. Particularly, the station with delay-sensitive traffic among the stations corresponding to the beacon interval can contend for a channel in the contention period; particularly, there can be two methods for channel contention:

One method is that, for a small data service scenario, each station contends for a channel directly with a data frame so as to reduce overhead.

The other is to contend for a channel using an RTS/CTS mechanism, particularly, each station contends for a channel using an RTS frame, once a certain station succeeds in transmitting the RTS frame and receives a CTS frame responded by an AP, then the station immediately transmits its own data frame, and other stations within the time period can detect the data frame transmitted by the station.

On the basis of the above scheduling process, in order to avoid overlong idle time of the channel, further save time sources, and improve transmission efficiency, optionally, the scheduling method provided in this embodiment further can re-arrange and re-allocate time, which particularly includes:

The AP detects a channel is idle during a preset duration within a time period allocated to the station, the AP issues a third release message to actively release time remained in the time period, the third release message contains a time period re-arranged by the AP and allocated to each station, each station transmits data within the time period allocated to the station according to the time period re-arranged by the AP and allocated to each station, so that scheduling of other station can be advanced when a time period is idle, so as to avoid overlong idle time of the channel.

Compared with the solution that one time period is allocated to one station for data transmission, this embodiment that at least one time period is allocated to at least two stations for data transmission can improve the utilization of time periods, save time resources and enhance transmission efficiency. In addition, a contention period is reserved in the beacon interval for data transmission by the station with delay-sensitive traffic, which can well take account of the transmission efficiency of the delay-sensitive traffic during scheduling. In addition, detecting a channel is idle during a preset duration within a time period allocated to each station, issuing a third release message to actively release time remained in the time period, re-arranging a time period allocated to each station, can avoid overlong idle time of the channel, further save time sources, and improve transmission efficiency.

Subsequent embodiment of the present invention provides an apparatus for implementing or applying the above method, which can be an access point AP or a station STA in a WLAN system. The AP and STA respectively implement or operate corresponding methods and functions in the above method embodiments.

Embodiment 5

Figure 13:
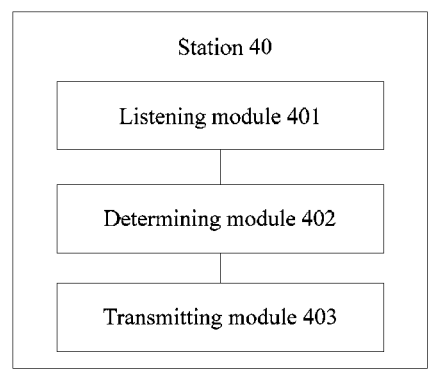
FIG. 13 is a schematic structural diagram of a station provided in Embodiment 5 of the present invention.

Referring to FIG. 13, this embodiment provides a station 40, the station 40 including:

a listening module 401, configured to listen to a first beacon frame, where the first beacon frame contains a delivery traffic indication message DTIM message used for indicating a beacon interval allocated for each group of stations within a current scheduling period;

a determining module 402, configured to determine the beacon interval allocated for the station within the current scheduling period according to the DTIM message contained in the first beacon frame;

the listening module 401 is further configured to listen to, within the beacon interval allocated for the station, a second beacon frame, where the second beacon frame contains scheduling information of the current beacon interval used for indicating a time period allocated to each group of stations for data transmission within the current beacon interval, and at least one group of stations comprises at least two stations; and a transmitting module 403, configured to transmit, when data transmission is required, data within the time period allocated to the group to which the station belongs according to an indication of the scheduling information of the current beacon interval.

Particularly, the transmitting module 403 includes a first transmitting unit or a second transmitting unit, the first transmitting unit is configured to transmit data in a contention mode within the time period allocated to the group to which the station belongs;

the second transmitting unit is configured to transmit data, according to a sub time period assigned by an access point within the time period allocated to the group to which the station belongs.

Further, the scheduling information is further used for indicating a starting time of a contention period within this beacon interval;

the station further includes a contending module, configured to contend for a channel in the contention period when there is delay-sensitive traffic, after transmitting data within the time period allocated to the group to which the station belongs.

Compared with the solution that one time period is allocated to one station for data transmission, this embodiment that one time period is allocated to one group of stations for data transmission and at least one group of stations comprises at least two stations can improve the utilization of time periods, save time resources and enhance transmission efficiency. In addition, a contention period is reserved in the beacon interval for data transmission by the station with delay-sensitive traffic, which can well take account of the transmission efficiency of the delay-sensitive traffic during scheduling.

Embodiment 6

Figure 14:
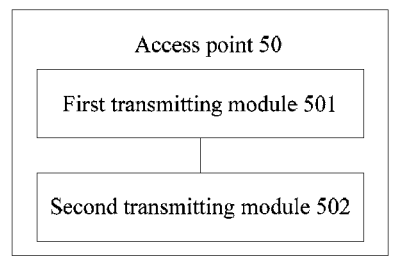
FIG. 14 is a schematic structural diagram of an access point provided in Embodiment 6 of the present invention.

Referring to FIG. 14, this embodiment provides an access point 50, the access point 50 including:

a first transmitting module 501, configured to transmit in a first cycle a first beacon frame, where the first beacon frame contains a delivery traffic indication message DTIM message used for indicating a beacon interval allocated for each group of stations within a current scheduling period, so that a station can determine the beacon interval allocated for the station within the current scheduling period according to the DTIM message contained in the first beacon frame;

a second transmitting module 502, configured to transmit in a second cycle a second beacon frame, where the second beacon frame contains scheduling information of the current beacon interval used for indicating a time period allocated to each group of stations for data transmission within the current beacon interval, and at least one group of stations comprises at least two stations, so that the station requiring data transmission can transmit data within the time period allocated to the group to which the station requiring data transmission belongs, according to an indication of the scheduling information of the current beacon interval.

Further, the access point further includes an allocating module, configured to assign, for the time period allocated to each group of stations, a sub time period for a station to transmit data, so that the station requiring data transmission can transmit data, according to a sub time period assigned by the access point within the time period allocated to the group to which the station requiring data transmission belongs.

Further, the scheduling information is further used for indicating a starting time of a contention period within the current beacon interval, so that a station with delay-sensitive traffic can contend for a channel within the contention period.

Further, the access point further includes:

a first releasing module, configured to start timing after the station succeeds in the contention during the contention period, and transmit a first releasing message when a first duration is arrived, so that the station with delay-sensitive traffic in each group of stations corresponding to the current beacon interval can start to contend for the remaining time period of the contention period after receiving the first release message.

Further, the access point further includes:

a second releasing module, configured to transmit a second releasing message when a channel is idle during a second duration, where the second releasing module contains a time period re-arranged by the access point and allocated to each group of stations for data transmission within the current beacon interval, so that a station receiving the second releasing message can transmit data within the time period allocated to the group to which the station receiving the second releasing message belongs, according to the time period re-arranged by the access point and allocated to each group of stations within the current beacon interval.

Compared with the solution that one time period is allocated to one station for data transmission, this embodiment that one time period is allocated to one group of stations for data transmission and at least one group of stations comprises at least two stations can improve the utilization of time periods, save time resources and enhance transmission efficiency. In addition, a contention period is reserved in the beacon interval for data transmission by the station with delay-sensitive traffic, which can well take account of the transmission efficiency of the delay-sensitive traffic during scheduling. In addition, detecting a channel is idle during a preset duration within a time period allocated to each group of stations, issuing a second release message to actively release time remained in corresponding time period of the group, re-arranging a time period allocated to each group of stations, can avoid overlong idle time of the channel, further save time sources, and improve transmission efficiency.

Embodiment 7

Figure 15:
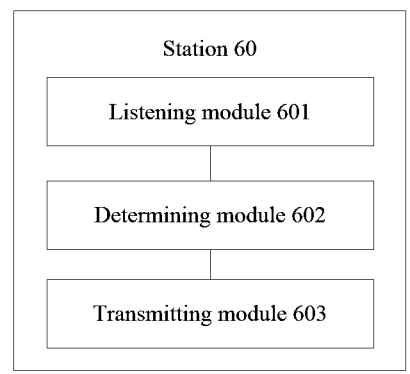
FIG. 15 is a schematic structural diagram of a station provided in Embodiment 7 of the present invention.

Referring to FIG. 15, this embodiment provides a station 60, the station 60 including:

a listening module 601, configured to listen to a third beacon frame, where the third beacon frame contains a delivery traffic indication message DTIM message used for indicating a beacon interval allocated for each group of stations within a current scheduling period;

a determining module 602, configured to determine the beacon interval allocated for the station within the current scheduling period according to the DTIM message contained in the third beacon frame;

the listening module 601 is further configured to listen to, within the beacon interval allocated for the station, a fourth beacon frame, where the fourth beacon frame contains scheduling information of the current beacon interval used for indicating a time period allocated to each station for data transmission within the current beacon interval, each time period is allocated to at least one station, and at least one time period is allocated to at least two stations; and a transmitting module 603, configured to transmit, when data transmission is required, data within the time period allocated to the station, according to an indication of the scheduling information of the current beacon interval.

Particularly, the transmitting module 603 includes a first transmitting unit or a second transmitting unit, the first transmitting unit is configured to transmit data in a contention mode within the time period allocated to the station;

or, the second transmitting unit is configured to transmit data, according to a sub time period assigned by an AP within the time period allocated to the station.

Further, the scheduling information is further used for indicating a starting time of a contention period within the current beacon interval;

the station further includes a contending module, configured to contend for a channel in the contention period when there is delay-sensitive traffic, after transmitting data within the time period allocated to the station.

Compared with the solution that one time period is allocated to one station for data transmission, this embodiment that at least one time period is allocated to at least two stations for data transmission can improve the utilization of time periods, save time resources and enhance transmission efficiency. In addition, a contention period is reserved in the beacon interval for data transmission by the station with delay-sensitive traffic, which can well take account of the transmission efficiency of the delay-sensitive traffic during scheduling.

Embodiment 8

Figure 16:
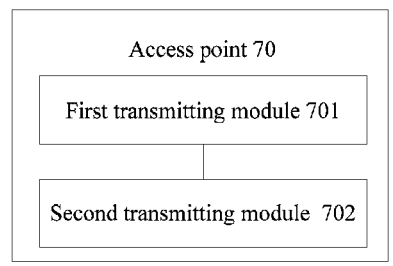
FIG. 16 is a schematic structural diagram of an access point provided in Embodiment 8 of the present invention.

Referring to FIG. 16, this embodiment provides an access point 70, the access point 70 including:

a first transmitting module 701, configured to transmit in a first cycle a third beacon frame, where the third beacon frame contains a delivery traffic indication message DTIM message used for indicating a beacon interval allocated for each station within a current scheduling period, so that the station can determine the beacon interval allocated for the station within the current scheduling period according to the DTIM message contained in the third beacon frame;

a second transmitting module 702, configured to transmit in a second cycle a fourth beacon frame, where the fourth beacon frame contains scheduling information of the current beacon interval used for indicating a time period allocated to each station for data transmission within the current beacon interval, each time period is allocated to at least one station, and at least one time period is allocated to at least two stations, so that a station requiring data transmission can transmit data within the time period allocated to the station requiring data transmission according to an indication of the scheduling information of the current beacon interval.

Further, the access point further includes an allocating module, configured to assign, for the time period allocated to each station, a sub time period for a station to transmit data, so that the station requiring data transmission can transmit data, according to a sub time period assigned by the AP within the time period allocated to the station requiring data transmission.

Further, the access point further includes:

a third transmitting module, configured to transmit a third releasing message when a channel is idle during a third duration, where the third releasing message contains a time period re-arranged by the access point and allocated to each station within the current beacon interval, so that a station receiving the third releasing message transmits data within the time period allocated to the station receiving the third releasing message, according to the time period re-arranged by the access point and allocated to each station for data transmission within the current beacon interval.

Compared with the solution that one time period is allocated to one station for data transmission, this embodiment that at least one time period is allocated to at least two stations for data transmission can improve the utilization of time periods, save time resources and enhance transmission efficiency. In addition, a contention period is reserved in the beacon interval for data transmission by the station with delay-sensitive traffic, which can well take account of the transmission efficiency of the delay-sensitive traffic during scheduling. In addition, detecting a channel is idle during a preset duration within a time period allocated to each station, issuing a third release message to actively release time remained in the time period, re-arranging a time period allocated to each station, can avoid overlong idle time of the channel, further save time sources, and improve transmission efficiency.

Embodiment 9

Figure 17:
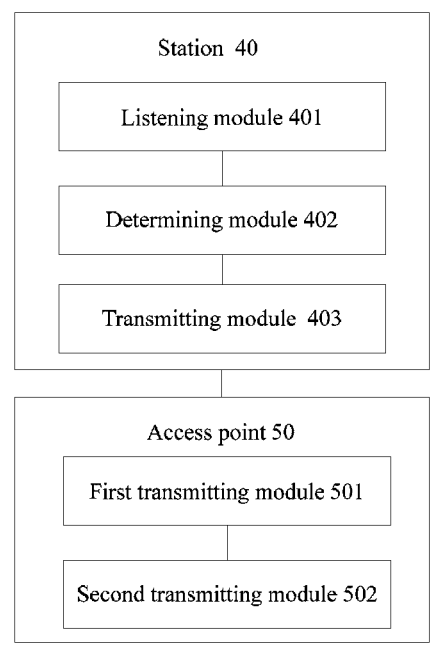
FIG. 17 is a schematic structural diagram of a scheduling system provided in Embodiment 9 of the present invention.

Referring to FIG. 17, this embodiment provides a scheduling system, where the scheduling system includes an access point 50 and a station 40;

The access point 50 includes:

a first transmitting module 501, configured to transmit in a first cycle, a first beacon frame, where the first beacon frame contains a delivery traffic indication message DTIM message used for indicating a beacon interval allocated for each group of stations within a current scheduling period;

a second transmitting module 502, configured to transmit, in a second cycle, a second beacon frame, where the second beacon frame contains scheduling information of the current beacon interval used for indicating a time period allocated to each group of stations for data transmission within the current beacon interval, and at least one group of stations comprises at least two stations; and The station includes:

a listening module 401, configured to listen to the first beacon frame;

a determining module 402, configured to determine the beacon interval allocated for the station within the current scheduling period, according to the DTIM message contained in the first beacon frame;

the listening module 401 is further configured to listen to, within the beacon interval allocated for the station, the second beacon frame; and a transmitting module 403, configured to transmit, when data transmission is required, data within the time period allocated to the group to which the station belongs, according to an indication of the scheduling information of the current beacon interval.

Further, the scheduling information is further used for indicating a starting time of a contention period within the current beacon interval;

the station further includes a contending module, configured to contend for a channel in the contention period when there is delay-sensitive traffic, after transmitting data within the time period allocated to the group to which the station belongs.

Compared with the solution that one time period is allocated to one station for data transmission, this embodiment that at least one time period is allocated to at least two stations for data transmission can improve the utilization of time periods, save time resources and enhance transmission efficiency. In addition, a contention period is reserved in the beacon interval for data transmission by the station with delay-sensitive traffic, which can well take account of the transmission efficiency of the delay-sensitive traffic during scheduling.

Embodiment 10

Figure 18:
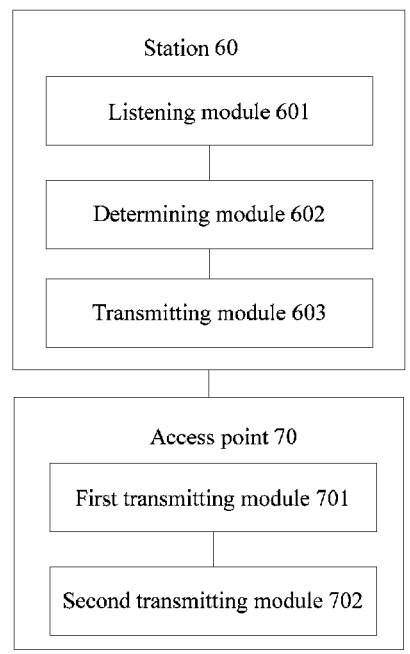
FIG. 18 is a schematic structural diagram of a scheduling system provided in Embodiment 10 of the present invention.

Referring to FIG. 18, this embodiment provides a scheduling system, where the scheduling system includes an access point 70 and a station 60;

The access point 70 includes:

a first transmitting module 701, configured to transmit, in a first cycle, a third beacon frame, where the third beacon frame contains a delivery traffic indication message DTIM message used for indicating a beacon interval allocated for each station within a current scheduling period;

a second transmitting module 702, configured to transmit, in a second cycle, a fourth beacon frame, where the fourth beacon frame contains scheduling information of the current beacon interval used for indicating a time period allocated to each station for data transmission within the current beacon interval, each time period is allocated to at least one station, and at least one time period is allocated to at least two stations; and The station 60 includes:

a listening module 601, configured to listen to the third beacon frame;

a determining module 602, configured to determine the beacon interval allocated for the station within the current scheduling period, according to the DTIM message contained in the third beacon frame;

the listening module 601, being further configured to listen to, within the beacon interval allocated for the station, the fourth beacon frame; and a transmitting module 603, configured to transmit, when data transmission is required, data within the time period allocated to the station, according to an indication of the scheduling information of the current beacon interval.

Further, the scheduling information is further used for indicating a starting time of a contention period within the current beacon interval;

the station further includes: a contending module, configured to contend for a channel in the contention period when there is delay-sensitive traffic, after transmitting data within the time period allocated to the station.

Compared with the solution that one time period is allocated to one station for data transmission, this embodiment that at least one time period is allocated to at least two stations for data transmission can improve the utilization of time periods, save time resources and enhance transmission efficiency. In addition, a contention period is reserved in the beacon interval for data transmission by the station with delay-sensitive traffic, which can well take account of the transmission efficiency of the delay-sensitive traffic during scheduling.

Persons skilled in the art can clearly know that, the device embodiments described above are illustrative in nature, and the partition of units/modules of the device is from the perspective of logical functions only and may be in a different way in practical application. For example, all functional units/modules can be physically stand-alone, or integrated into a processing module, or two or more of the units/modules are integrated into one unit/module. The integrated unit/module above can be implemented in hardware, or software functional units/modules.

It should be appreciated by persons skilled in the art that, all or a part of the steps in the above embodiments can be implemented by a hardware, or through a program instructing a relevant hardware, and the program may be stored in a computer readable storage medium, such as a read only memory, a floppy disk, or an optical disk.

What is claimed is:

1. A scheduling method, comprising:

listening, by a station, to a first beacon frame, wherein the first beacon frame contains a delivery traffic indication message (DTIM) used for indicating a beacon interval allocated for each group of stations within a current scheduling period;

determining, by the station, the beacon interval allocated for the station within the current scheduling period according to the DTIM contained in the first beacon frame;

listening, by the station within the beacon interval allocated for the station, to a second beacon frame, wherein the second beacon frame contains scheduling information of the beacon interval allocated for the station used for indicating a time period allocated to each group of stations for data transmission within the beacon interval allocated for the station, and wherein the beacon interval comprises one fixed length period which is partitioned into at least two time periods, each of the at least two time periods is allocated to one group of stations, and at least one group of stations comprises at least two stations; and when data transmission is required, transmitting, by the station, data within the time period allocated to a group to which the station belongs, according to an indication of the scheduling information of the beacon interval allocated for the station.

2. The method according to claim 1, wherein the transmitting, by the station, the data within the time period allocated to the group to which the station belongs, comprises:

transmitting, by the station, the data in a contention mode, within the time period allocated to the group to which the station belongs;

or, transmitting, by the station, the data according to a sub time period assigned by an access point within the time period allocated to the group to which the station belongs.

3. The method according to claim 1, wherein the scheduling information is further used for indicating a starting time of a contention period within the beacon interval allocated for the station;

after transmitting the data within the time period allocated to the group to which the station belongs, the method further comprises: contending for a channel in the contention period when the station has delay-sensitive traffic.

4. The method according to claim 3, wherein, after contending for the channel in the contention period when the station has the delay-sensitive traffic, the method further comprises:

when other stations in the group to which the station belongs determine that the group to which the station belongs successfully contends for the channel, contending for a channel within a first duration by a station with the delay-sensitive traffic in the group to which the station belongs.

5. The method according to claim 4, wherein, after contending for the channel within the first duration by the station with the delay-sensitive traffic in the group to which the station belongs, the method further comprises:

when the first duration is arrived, after receiving, by the station with the delay-sensitive traffic in each group of stations corresponding to the beacon interval allocated for the station, a first releasing message transmitted by an access point, starting to contend for a remaining time period of the contention period.

6. The method according to claim 1, wherein after transmitting, by the station, data within the time period allocated to the group to which the station belongs, the method further comprises:

transmitting data, by a station receiving a second releasing message transmitted by an access point, within the time period allocated to the group to which the station receiving the second releasing message belongs, according to a time period that is included in the second releasing message, re-arranged by the access point when a channel is idle during a second duration, and allocated to each group of stations for data transmission within the beacon interval allocated for the station.

7. A scheduling method, comprising:

transmitting, by an access point, in a first cycle, a first beacon frame, wherein the first beacon frame contains a delivery traffic indication message (DTIM) used for indicating a beacon interval allocated for each group of stations within a current scheduling period, so that the stations determine the beacon interval allocated for each station within the current scheduling period according to the DTIM contained in the first beacon frame;

transmitting, by the access point, in a second cycle, a second beacon frame, wherein the second beacon frame contains scheduling information of the beacon interval allocated for the station used for indicating a time period allocated to each group of stations for data transmission within the beacon interval allocated for the station, and wherein the beacon interval comprises one fixed length period which is partitioned into at least two time periods, each of the at least two time periods is allocated to one group of stations, and at least one group of stations comprises at least two stations, so that a station requiring data transmission transmits data within the time period allocated to the group of stations to which the station requiring the data transmission belongs according to an indication of the scheduling information of the beacon interval allocated for the station.

8. The method according to claim 7, wherein the method further comprises: assigning, by the access point, for the time period allocated to each group of stations, a sub time period for a station to transmit data, so that the station requiring data transmission transmits data according to the sub time period assigned by the access point within the time period allocated to the group to which the station requiring data transmission belongs.

9. The method according to claim 7, wherein the scheduling information is further used for indicating a starting time of a contention period within the beacon interval allocated for the station, so that a station with delay-sensitive traffic contends for a channel during the contention period.

10. The method according to claim 9, wherein the method further comprises:

starting timing, by the access point, after the station succeeds in the contention during the contention period, and transmitting a first releasing message when a first duration arrives, so that the station with the delay-sensitive traffic in each group of stations corresponding to the beacon interval allocated for the station starts to contend for a remaining time period of the contention period after receiving the first release message.

11. The method according to claim 7, wherein the method further comprises:

transmitting, by the access point, a second releasing message when a channel is idle during a second duration, wherein the second releasing message contains a time period re-arranged by the access point and allocated to each group of stations for data transmission within the beacon interval allocated for the station, so that a station receiving the second releasing message transmits data within the time period allocated to the group to which the station receiving the second releasing message belongs according to the time period re-arranged by the access point and allocated to each group of stations within the beacon interval allocated for the station.

12. A station, comprising:

a non-transitory processor readable medium storing instructions; and a processor executing the instructions stored in the non-transitory processor readable medium, which configures the station to:

listen to a first beacon frame, wherein the first beacon frame contains a delivery traffic indication message (DTIM) used for indicating a beacon interval allocated for each group of stations within a current scheduling period;

determine the beacon interval allocated for the stations within the current scheduling period according to the DTIM contained in the first beacon frame;

wherein the station is further configured to listen, within the beacon interval allocated for the stations within the current scheduling period, to a second beacon frame, the second beacon frame contains scheduling information of the beacon interval allocated for the station used for indicating a time period allocated to each group of stations for data transmission within the beacon interval allocated for the station, and wherein the beacon interval comprises one fixed length period which is partitioned into at least two time periods, each of the at least two time periods is allocated to one group of stations and at least one group of stations comprises at least two stations; and the processor executes instructions stored in the non-transitory processor readable medium that further configures the station to transmit, when data transmission is required, data within the time period allocated to the group to which the station belongs according to an indication of the scheduling information of the beacon interval allocated for the station.

13. The station according to claim 12, wherein
the station is further configured to transmit data in a contention mode within the time period allocated to the group to which the station belongs; and
the station is further configured to transmit data, according to a sub time period assigned by an access point within the time period allocated to the group to which the station belongs.

14. The station according to claim 12, wherein the scheduling information is further used for indicating a starting time of a contention period within the beacon interval allocated for the station; and
the station further is configured to contend for a channel in the contention period when there is delay-sensitive traffic, after transmitting data within the time period allocated to the group to which the station belongs.

15. An access point, comprising:
a non-transitory processor readable medium storing instructions; and
a processor executing the instructions stored in the non-transitory processor readable medium, which configures the access point to:
transmit in a first cycle a first beacon frame, wherein the first beacon frame contains a delivery traffic indication message (DTIM) used for indicating a beacon interval allocated for each group of stations within a current scheduling period, so that the stations determine the beacon interval allocated for the stations within the current scheduling period according to the DTIM contained in the first beacon frame;
transmit in a second cycle a second beacon frame, wherein the second beacon frame contains scheduling information of the beacon interval allocated for the station used for indicating a time period allocated to each group of stations for data transmission within the beacon interval allocated for the station, and wherein the beacon interval comprises one fixed length period which is partitioned into at least two time periods, each of the at least two time periods is allocated to one group of stations and at least one group of stations comprises at least two stations, so that a station requiring data transmission transmits data within the time period allocated to the group to which the station requiring data transmission belongs according to an indication of the scheduling information of the beacon interval allocated for the station.

16. The access point according to claim 15, wherein the access point is further configured to assign, for the time period allocated to each group of stations, a sub time period for a station to transmit data, so that the station requiring data transmission transmits data according to the sub time period assigned by the access point within the time period allocated to the group to which the station requiring data transmission belongs.

17. The access point according to claim 15, wherein the scheduling information is further used for indicating a starting time of a contention period within the beacon interval allocated for the station, so that a station with delay-sensitive traffic contends for the channel within the contention period.

18. The access point according to claim 17, wherein the access point is further
configured to start timing after the station succeeds in the contention within the contention period, and transmit a first releasing message when a first duration is arrived, so that the station with the delay-sensitive traffic in each group of stations corresponding to the beacon interval allocated for the station starts to contend for a remaining time period of the contention period after receiving the first release message.

19. The access point according to claim 15, wherein the access point is further configured to transmit a second releasing message when a channel is idle during a second duration, wherein the second releasing message contains a time period re-arranged by the access point and allocated to each group of stations for data transmission within the-beacon interval allocated for the station, so that a station receiving the second releasing message transmits data within the time period allocated to the group to which the station receiving the second releasing message belongs according to the time period re-arranged by the access point and allocated to each group of stations within the beacon interval allocated for the station.

* * * * *